United States Patent
Basile et al.

(10) Patent No.: US 10,030,758 B2
(45) Date of Patent: Jul. 24, 2018

(54) TWO-PIECE ZERO DISTORTION PULLEY ASSEMBLY HAVING OUTER BEARING RACEWAY

(71) Applicant: Ford Global Technologies, LLC, Dearborn, MI (US)

(72) Inventors: James M. Basile, Dundee, MI (US); Scott A. Willis, Gibraltar, MI (US); Joseph A. Skrobowski, New Boston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 189 days.

(21) Appl. No.: 15/096,956

(22) Filed: Apr. 12, 2016

(65) Prior Publication Data

US 2017/0292599 A1     Oct. 12, 2017

(51) Int. Cl.
F16H 7/20       (2006.01)
F16H 55/36     (2006.01)
F16C 19/16     (2006.01)

(52) U.S. Cl.
CPC .............. F16H 55/36 (2013.01); F16C 19/16 (2013.01); *F16C 2361/63* (2013.01)

(58) Field of Classification Search
CPC .... F16C 13/006; F16C 2361/63; F16H 55/36; F16H 2007/0865; F16H 55/44
USPC ........................................................ 474/199
See application file for complete search history.

(56) References Cited

U.S. PATENT DOCUMENTS

| | | | | |
|---|---|---|---|---|
| 1,177,046 A | * | 3/1916 | Nice | F16C 13/006 16/46 |
| 1,479,417 A | * | 1/1924 | Leonard | B60B 3/08 152/427 |
| 1,482,579 A | * | 2/1924 | Nice | F16C 13/006 16/46 |
| 1,627,558 A | * | 5/1927 | Grunwald | F16C 13/006 29/463 |
| 1,679,691 A | * | 8/1928 | Smith | F16H 55/36 180/53.1 |
| 1,903,776 A | * | 4/1933 | Clark | F16C 35/077 29/520 |
| 1,932,289 A | * | 10/1933 | Jarvis | B60B 3/082 301/64.5 |
| 1,973,747 A | * | 9/1934 | Bukolt | B60B 27/001 301/64.303 |
| 2,137,987 A | * | 11/1938 | Smith | F16H 7/18 301/5.7 |

(Continued)

*Primary Examiner* — Henry Y Liu
(74) *Attorney, Agent, or Firm* — LeClairRyan (57) ABSTRACT

A zero distortion bearing pulley including a bearing is provided. The bearing clamps axially on the outer bearing raceway instead of radially. The pulley includes a stamped pulley body having a central axis, a pulley face having a periphery, a belt running surface extending perpendicularly from the periphery of the pulley face, a bearing slip pocket formed in the face coaxially with the axis of the pulley body, and a plurality of slots formed between the bearing pocket and the periphery of the pulley face. The slip pocket has a rear stop for retaining the bearing. A disc-shaped, stamped bearing retainer is provided having tabs that fit into the slots in the pulley body. The tabs may be folded over. Optionally, each tab may have an end hook allowing attachment of the stamped retainer bearing to the pulley body face by rotation following insertion of the tabs into the slots.

17 Claims, 9 Drawing Sheets

(56) References Cited

U.S. PATENT DOCUMENTS

| | | | | |
|---|---|---|---|---|
| 2,381,488 A * | 8/1945 | Coulson | B23Q 11/0032 | 248/657 |
| 2,417,239 A * | 3/1947 | Courtney | D01H 5/74 | 19/258 |
| 2,631,474 A * | 3/1953 | Skovera | F16H 37/00 | 384/547 |
| 2,655,813 A * | 10/1953 | Howell | F16H 55/36 | 29/892.11 |
| 2,655,814 A * | 10/1953 | Holm | F16H 7/18 | 474/167 |
| 2,669,878 A * | 2/1954 | Nelson | F16H 55/44 | 474/181 |
| 2,848,278 A * | 8/1958 | Todd | B60B 3/08 | 152/327 |
| 2,938,757 A * | 5/1960 | Pieper | F16B 39/28 | 254/390 |
| 3,367,199 A * | 2/1968 | Dankowski | F16H 55/42 | 474/168 |
| 3,565,490 A * | 2/1971 | Statz | B60O 7/24 | 301/64.303 |
| 3,954,017 A * | 5/1976 | Musgrove | F16H 55/46 | 474/179 |
| 4,580,846 A * | 4/1986 | Johnson | B60B 3/002 | 29/894.324 |
| 6,227,994 B1 * | 5/2001 | Niki | F02B 67/06 | 474/148 |
| 6,293,885 B1 * | 9/2001 | Serkh | F16C 13/006 | 474/133 |
| 7,108,623 B2 * | 9/2006 | Cadarette | F16H 55/36 | 474/166 |
| 7,364,522 B2 * | 4/2008 | Miyata | F16H 7/18 | 474/135 |
| 7,695,385 B2 * | 4/2010 | Barraud | F16C 35/04 | 384/484 |
| 2006/0142102 A1 * | 6/2006 | Radocaj | F16H 55/36 | 474/199 |
| 2013/0331215 A1 * | 12/2013 | Hewitt | F16H 55/44 | 474/174 |

\* cited by examiner

TWO-PIECE ZERO DISTORTION PULLEY ASSEMBLY HAVING OUTER BEARING RACEWAY

TECHNICAL FIELD

The disclosed inventive concept relates generally to pulley systems for vehicle engines. More particularly, the disclosed inventive concept relates to two-piece pulleys having ball bearings which demonstrate zero distortion of the outer bearing raceway upon assembly.

BACKGROUND OF THE INVENTION

The modern internal combustion engine usually incorporates a pulley drive system for powering accessories driven by the engine crankshaft. The accessories typically include an air conditioning compressor, a power steering pump, a water pump, and an alternator. A front end accessory drive belt is trained around pulleys to supply power from the crankshaft of the engine to the accessories. The drive belt makes frictional contact with the face of the pulleys. The drive belt is most often a flexible reinforced polymeric belt.

Each of the accessories requires a driven pulley. In addition, operating a number of accessories, particularly with a serpentine drive belt, requires that the belt be handled carefully to allow placement of the belt in the locations needed to drive the accessories without slippage. Precise location of the belt frequently calls for the use of one or more idler pulleys.

The use of idler pulleys to displace the drive belt thereby allowing non-direct belt routing has demonstrated certain deficiencies. Known pulley designs incorporate ball bearings (or a cartridge type of bearing) that require a press-fit of the ball bearing assembly or over-molding of the ball bearing in the pulley body to achieve bearing retention. However, frequently the press-fitting or over-molding operation distorts the outer race of the ball bearing, resulting in irregular internal radial clearance of the bearing. The distorted outer race is known to be a contributor to NVH issues and reduces bearing durability.

Another undesirable result of the assembly process is that the average radial internal clearance of the bearing is changed during press fit or over-molding operations. As a consequence, the resulting radial internal clearance tolerance of the bearing cannot be controlled tightly after press fitting or over-molding.

As in so many areas of vehicle technology, there is always room for improvements related to the design of a pulley for use in an internal combustion engine. Particularly, it would be advantageous to tightly control the radial internal clearance of the bearing so that bearing durability can be maximized.

SUMMARY OF THE INVENTION

The disclosed invention overcomes the problems of known pulley designs by providing a zero distortion bearing pulley that includes a bearing. Particularly, the disclosed inventive concept includes a two-piece pulley design that clamps axially on the outer bearing raceway instead of radially. Axial retention of the bearing in the pulley affects neither the roundness of the bearing outer race nor the radial internal clearance of the bearing.

The pulley includes a stamped pulley body having a central axis, a pulley face having a periphery, a belt running surface extending perpendicularly from the periphery of the pulley face, a slip pocket for a bearing formed in the face coaxially with the axis of the pulley body, and a plurality of slots formed between the bearing pocket and the periphery of the pulley face. The slip pocket has a rear stop for retaining a bearing which is fitted within the slip pocket.

A disc-shaped, stamped bearing retainer is provided that has a raised rounded area of the same diameter as the outer raceway of the bearing. The bearing retainer has tabs that fit into the slots in the pulley body. The tabs may be folded over following insertion into the slots. Optionally, each tab may have an end hook that allows attachment of the stamped retainer bearing to the pulley body face by rotation following insertion of the tabs into the slots. Following attachment, these tabs may also be folded over.

With the front bearing retainer in place, the ball bearing is clamped to the pulley assembly axially at the outer raceway causing it to rotate when the pulley is rotated. According to the disclosed design, axial retention of the bearing in the pulley rather than radial retention results in no effect on ball bearing outer race roundness or on bearing radial internal clearance. This design also provides a continuous (one piece) belt running surface unlike other two-piece pulley designs which split the running surface between the two pieces of the pulley.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

In the following figures, the same reference numerals will be used to refer to the same components. In the following description, various operating parameters and components are described for different constructed embodiments. These specific parameters and components are included as examples and are not meant to be limiting.

In general, the disclosed inventive concept provides a two-piece pulley design that clamps axially on the outer bearing raceway instead of radially resulting in axial retention of the bearing in the pulley rather than radial retention. Accordingly, the design as illustrated and discussed overcomes the problems typically associated with known pulley configurations.

Figure 1:
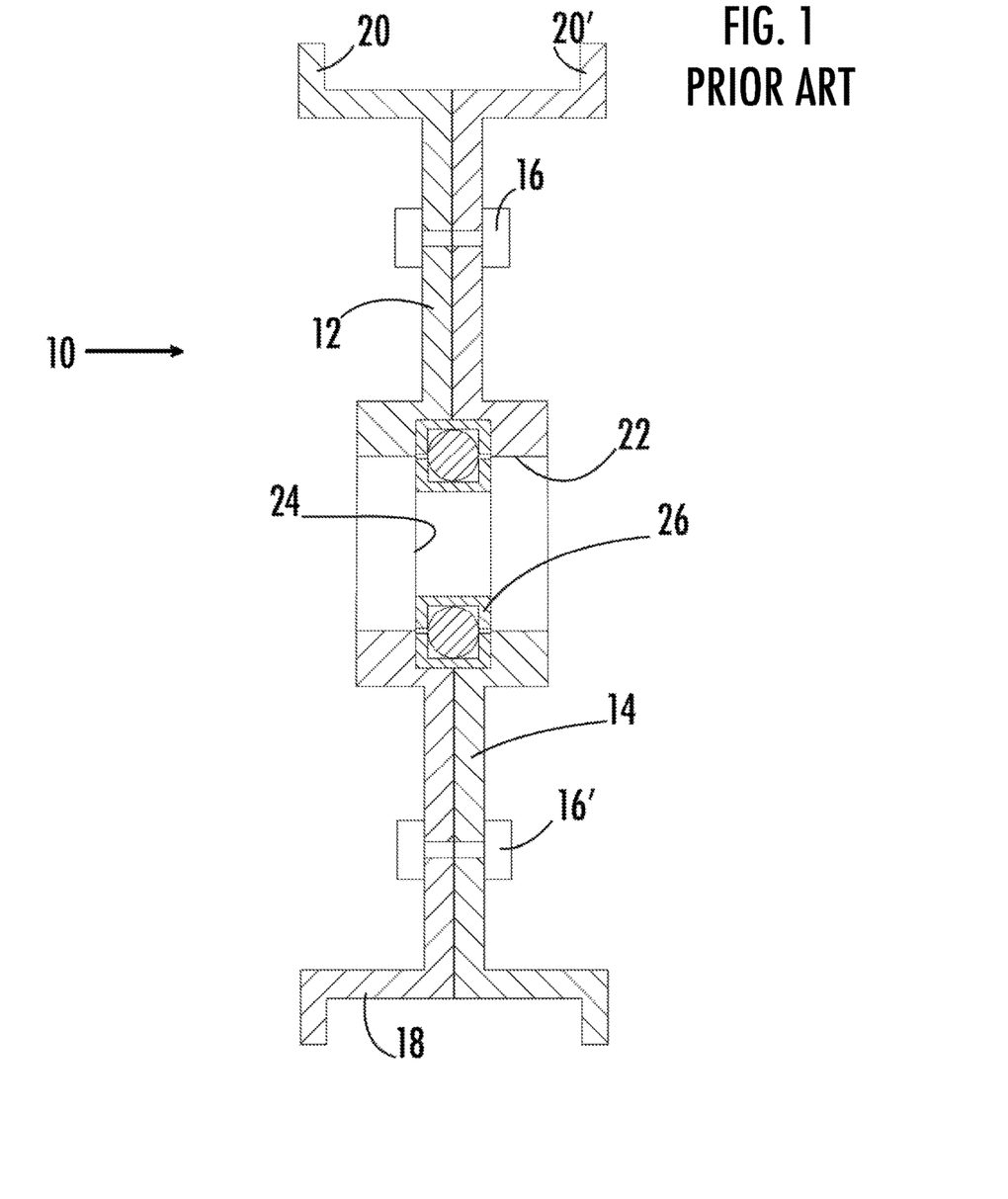
FIG. 1 is a sectional view of pulley according to existing technology.

A pulley according to the prior art is illustrated in FIG. 1. As shown and understood, the assembly of parts according known pulley designs either by press-fitting or over-molding frequently results in distortion of the outer race of the ball bearing, resulting in irregular internal radial clearance of the bearing which, as noted above, contributes to NVH issues and reduces overall bearing durability.

Referring to FIG. 1, a sectional view of pulley according to existing technology is illustrated. The pulley, generally illustrated as 10, includes a first half 12 and a second half 14. The halves 12 and 14 are conventionally attached by, for example, fasteners 16 and 16'. With the two halves 12 and 14 attached to one another, a pulley surface 18 is defined between a peripheral wall 20 formed on the first half 12 and a peripheral wall 20' formed on the second half 14. A central bore 22 is formed through the assembled halves 12 and 14 and a bearing pocket 24 is formed therebetween. A bearing 26 is fitted, typically by press-fitting, within the bearing pocket 24.

The disclosed inventive concept provides a desirable alternative to the arrangement shown in FIG. 1 and described in relation thereto. Particularly, the design of the disclosed inventive concept provides a continuous (one piece) belt running surface unlike other two-piece pulley designs which split the running surface between the two pieces of the pulley as is illustrated on the pulley surface 18 shown in FIG. 1. The disclosed inventive concept is shown in FIGS. 2 through 7 and is described hereafter.

Figure 2:
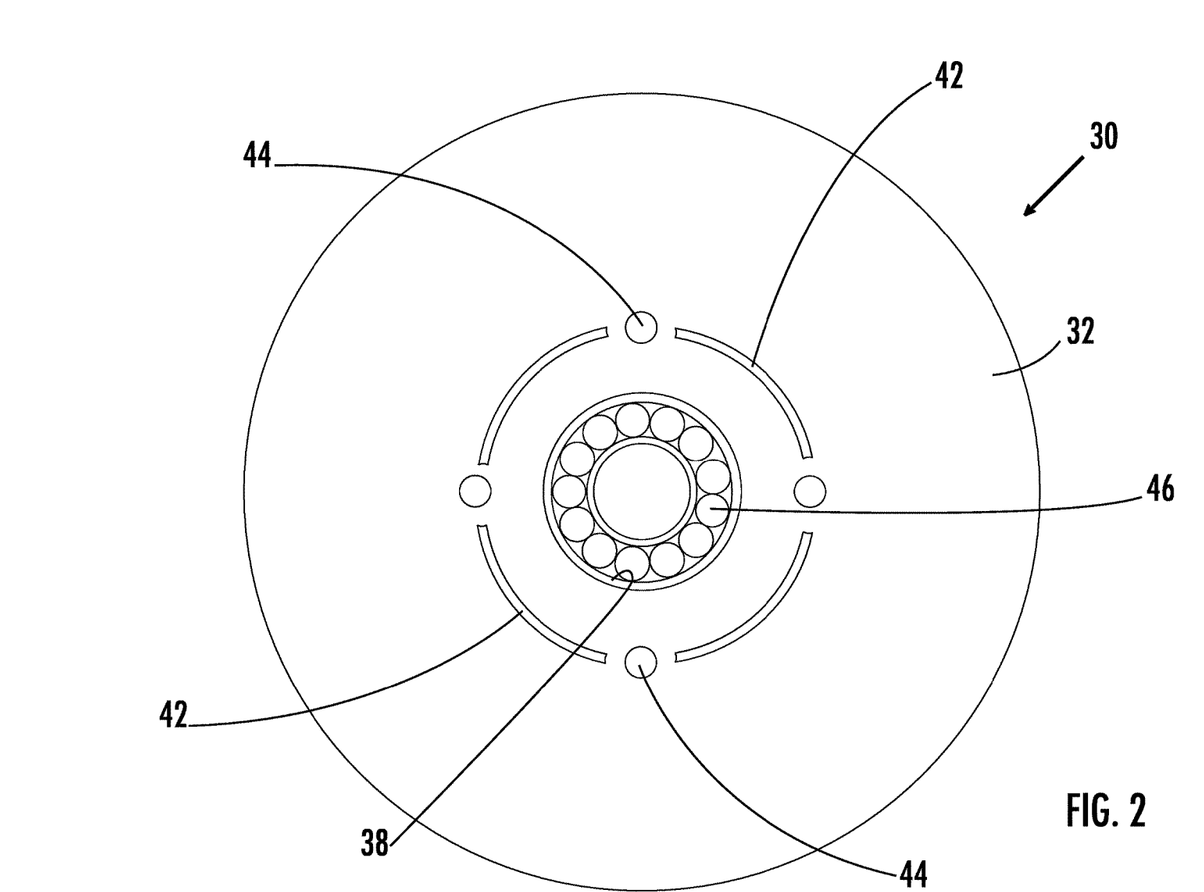
FIG. 2 illustrates a front view of a the zero distortion bearing pulley according to the disclosed inventive embodiment.
Figure 3:
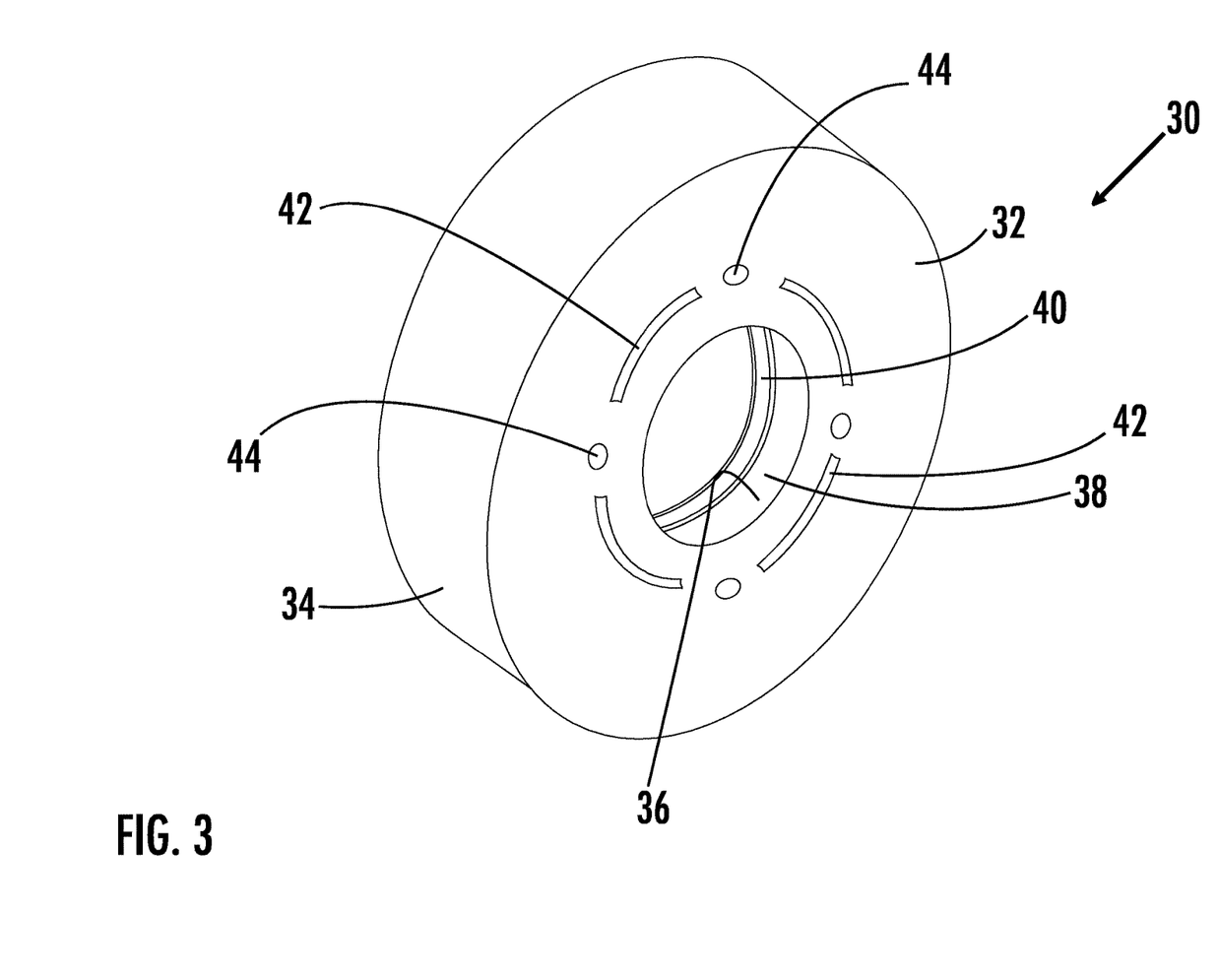
FIG. 3 illustrates a perspective view of the zero distortion bearing pulley shown in FIG. 1.

Referring to FIGS. 2 and 3, a front view and a perspective view are shown respectively of the zero distortion bearing pulley according to the disclosed inventive embodiment, generally illustrated as 30. It is to be understood that the particular shape and size of the pulley 30 as shown in the figures are only suggestive and are not intended to be limiting. For example, the width of the pulley 30 as well as its diameter could be varied.

The pulley 30 is preferably but not absolutely formed from a stamping includes a pulley face 32 having a periphery. A pulley surface 34 extends perpendicularly from the periphery of the pulley face 32. The pulley surface 34 is integrally formed with the pulley face 32. A central bore 36 is formed through the pulley face 32. Within the central bore 36 is formed a slip fit bearing pocket 38. As is understood, the shape of the slip fit bearing pocket 38 may be varied as needed to accommodate a variety of types and sizes of bearings. A back wall 40 is formed at the inner end of the slip fit bearing pocket 38 against which the bearing is braced.

Slots 42 are formed in the face 32 of the pulley 30. The slots 42 are positioned concentric with the central bore 36 and are formed between the slip fit bearing pocket 38 and the periphery of the pulley face 32. Tab hook receiving holes 44 are also formed on the face 32 of the pulley 30 for use with one embodiment of the bearing retainer as discussed below. The holes 44 are also positioned concentric with the central bore 36 and are formed between the slip fit bearing pocket 38 and the periphery of the pulley face 32.

A bearing assembly 46 is slip fitted into the slip fit bearing pocket 38. The illustrated bearing assembly 46 is of the radial ball bearing type, but it is to be understood that other bearing types, including but not limited to other ball bearing types, including angular contact and deep groove ball bearings and may further include without limitation roller bearing types, such as spherical, thrust, needle and tapered roller bearings. Thus the disclosed inventive concept may be readily adapted for use in virtually any application where a pulley is needed.

Figure 4:
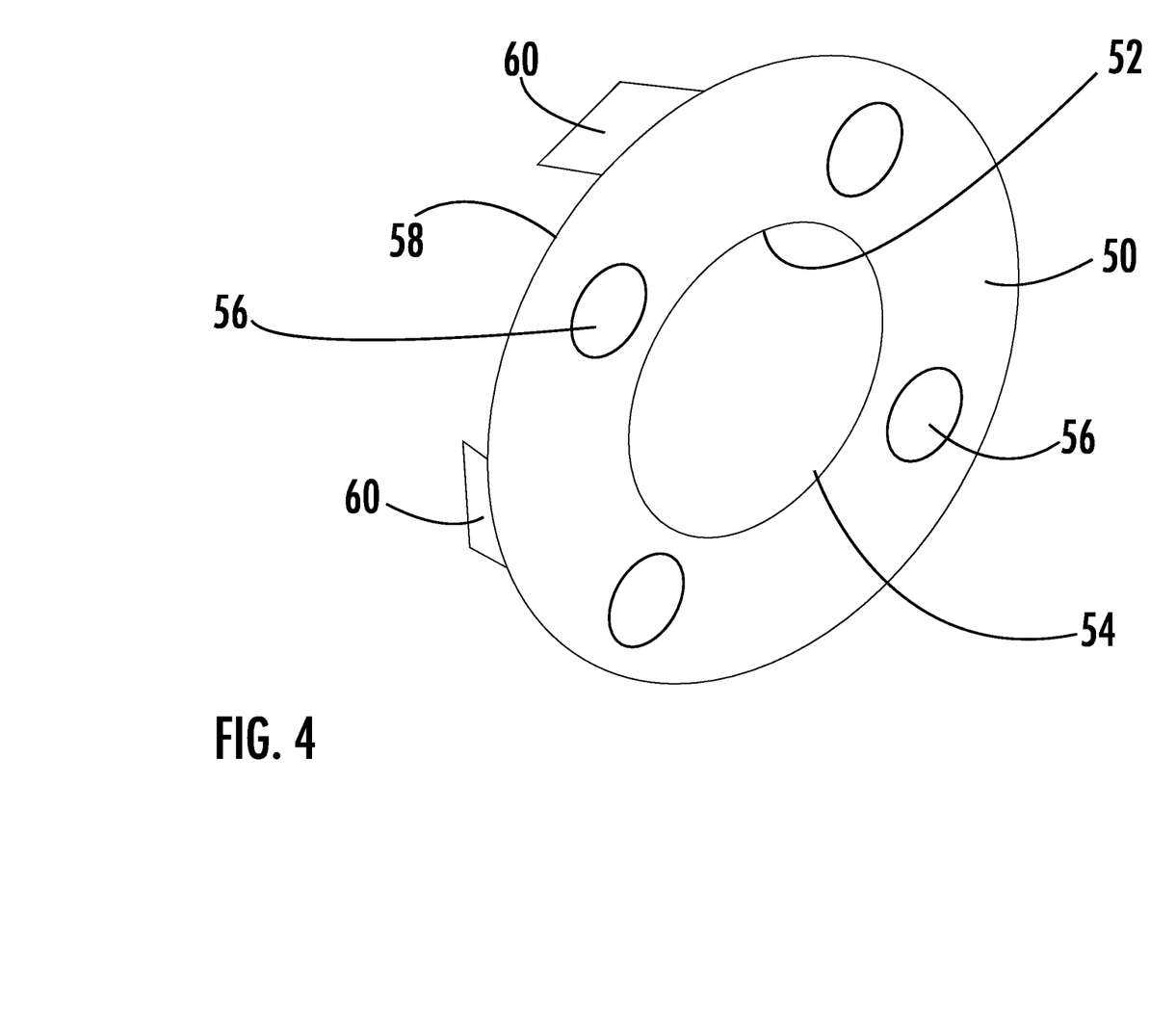
FIG. 4 illustrates a perspective view of a first embodiment of a bearing retainer for use with the zero distortion bearing pulley according to the disclosed inventive concept.
Figure 5:
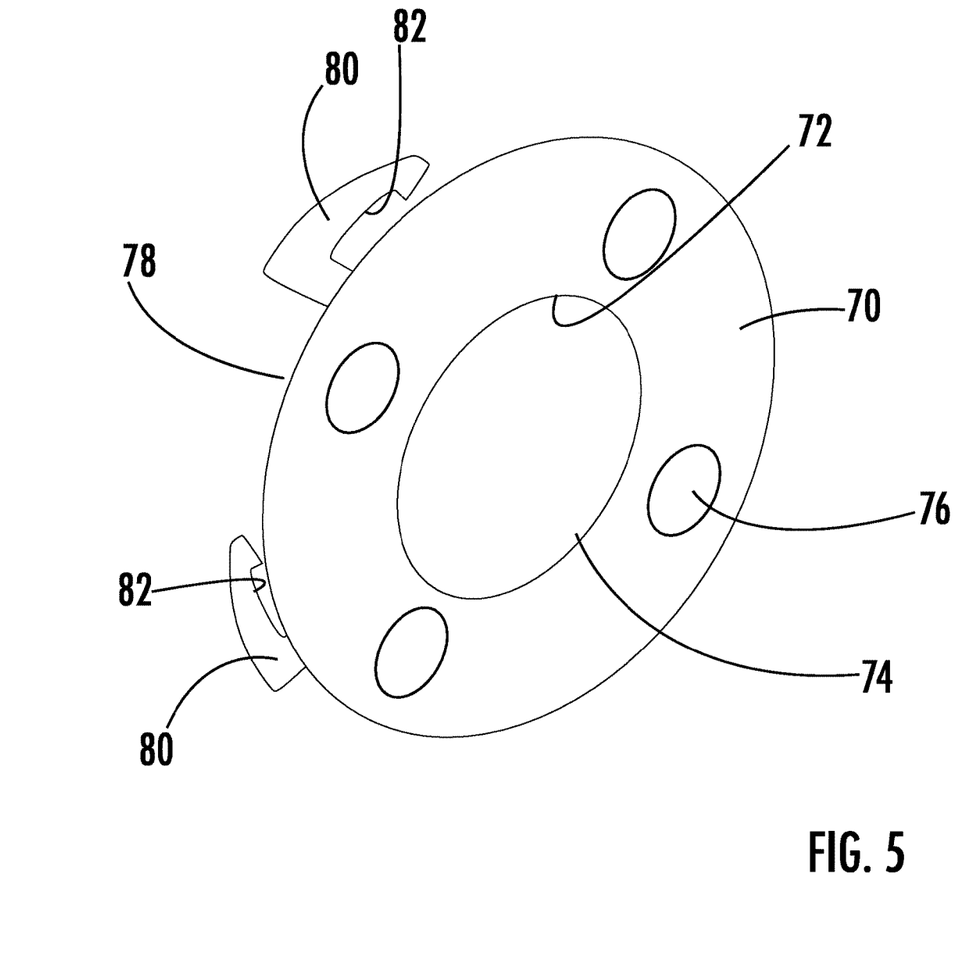
FIG. 5 illustrates a perspective view of a second embodiment of a bearing retainer for use with the zero distortion bearing pulley according to the disclosed inventive concept.

The pulley 30 includes a bearing retainer to hold the bearing assembly 46 in position within the slip fit bearing pocket 38. FIGS. 4 and 5 illustrate two embodiments of the bearing retainer according to the disclosed inventive concept.

Figure 8:
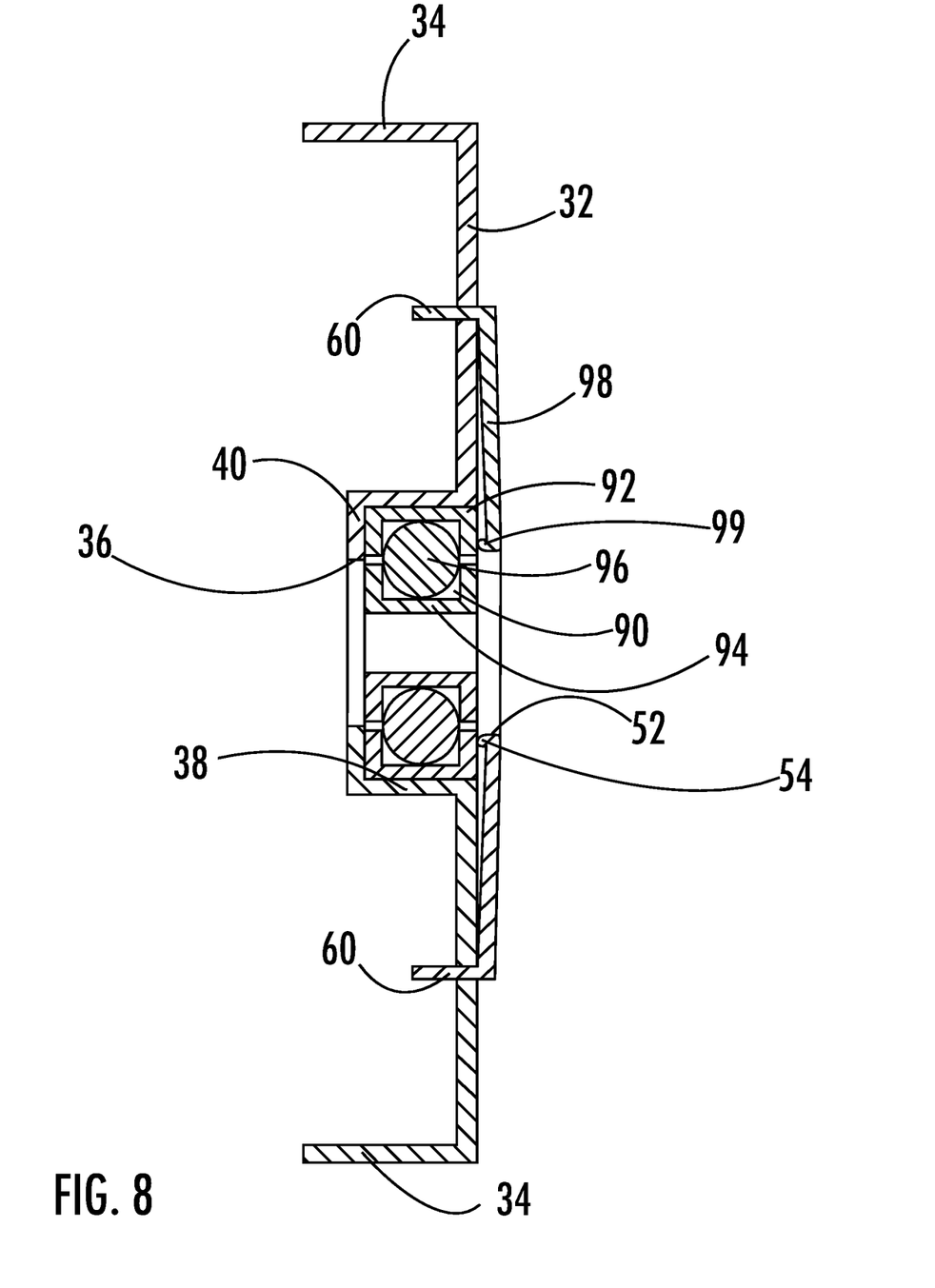
FIG. 8 is a sectional view of the zero distortion bearing pulley according to the disclosed inventive concept upon initial fitting of the first embodiment of the bearing retainer against the bearing face in which the retainer has a raised inner surface.
Figure 9:
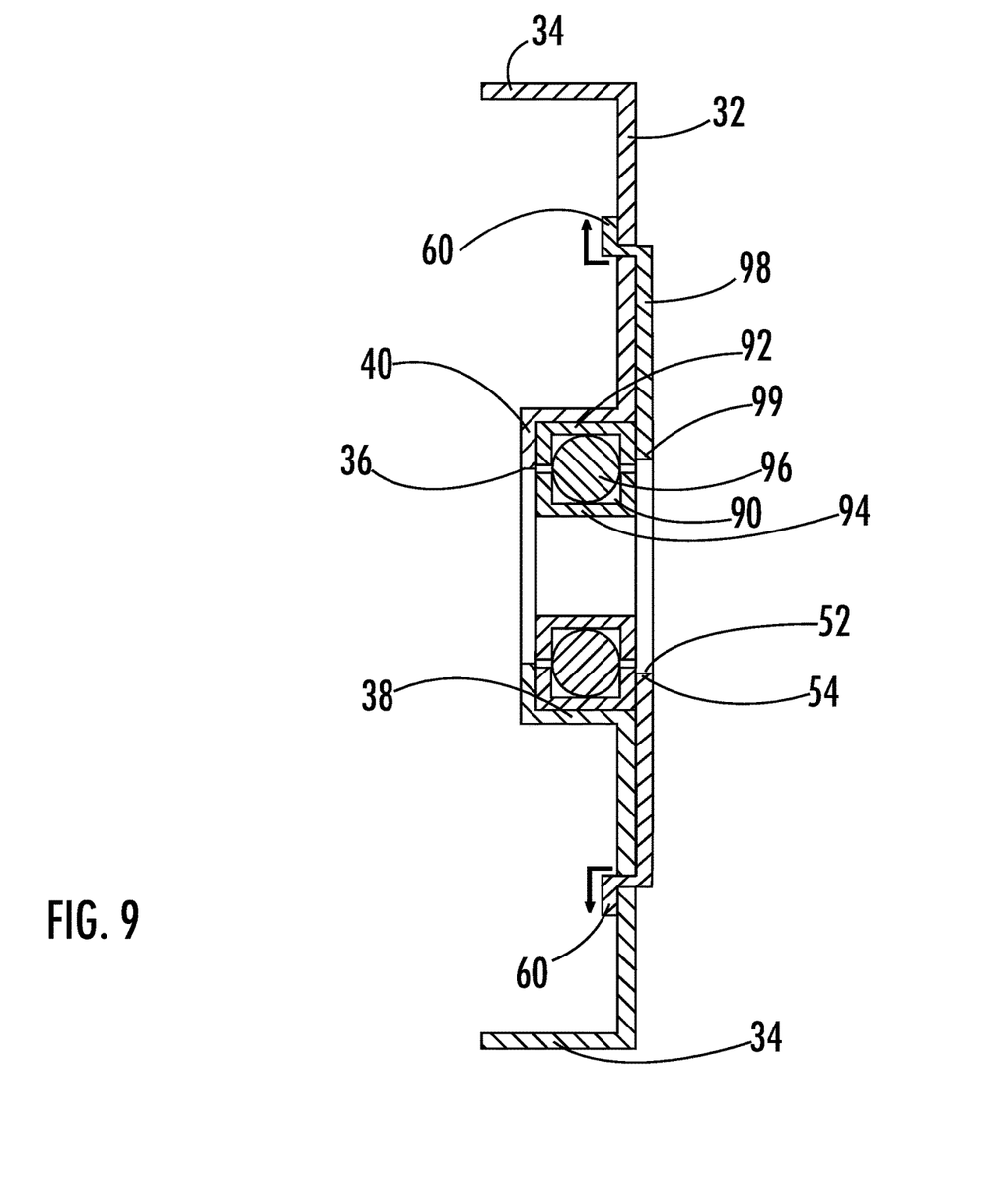
FIG. 9 is a sectional view of the zero distortion bearing pulley according to the disclosed inventive concept upon final fitting of the bearing retainer of FIG. 8.

Referring to FIG. 4, a first embodiment of a bearing retainer according to the disclosed inventive concept is illustrated. As shown, a disc-shaped bearing retainer 50 includes a central bore 52 defined by a flat retainer wall 54. The retainer wall 54 may alternatively have a raised rounded area as illustrated in FIGS. 8 and 9 and as discussed in relation thereto. Adjustment and alignment holes 56 are also formed on the bearing retainer 50 for use with an assembly tool as may be needed for proper fitting.

The bearing retainer 50 includes an outer periphery 58 from which a plurality of attachment tabs 60 extend. A greater or lesser number of attachment tabs 60 may be used. In addition, the attachment tabs 60 may be of shapes other than those illustrated in FIG. 4.

Referring to FIG. 5, a second embodiment of a bearing retainer according to the disclosed inventive concept is illustrated. As shown, a disc-shaped bearing retainer 70 includes a central bore 72 defined by a flat retainer wall 74. Like the retainer wall 54, the retainer wall 74 may alternatively have a raised rounded area as illustrated in FIGS. 8 and 9 and as discussed in relation thereto. Adjustment and alignment holes 76 are also formed on the bearing retainer 70 for use with an assembly tool as again discussed below.

The bearing retainer 70 includes an outer periphery 78 from which a plurality of attachment tabs 80 extend. A greater or lesser number of attachment tabs 80 may be used. Each of the attachment tabs 80 includes an elongated tab slot 82 and an end hook 84.

Figure 6:
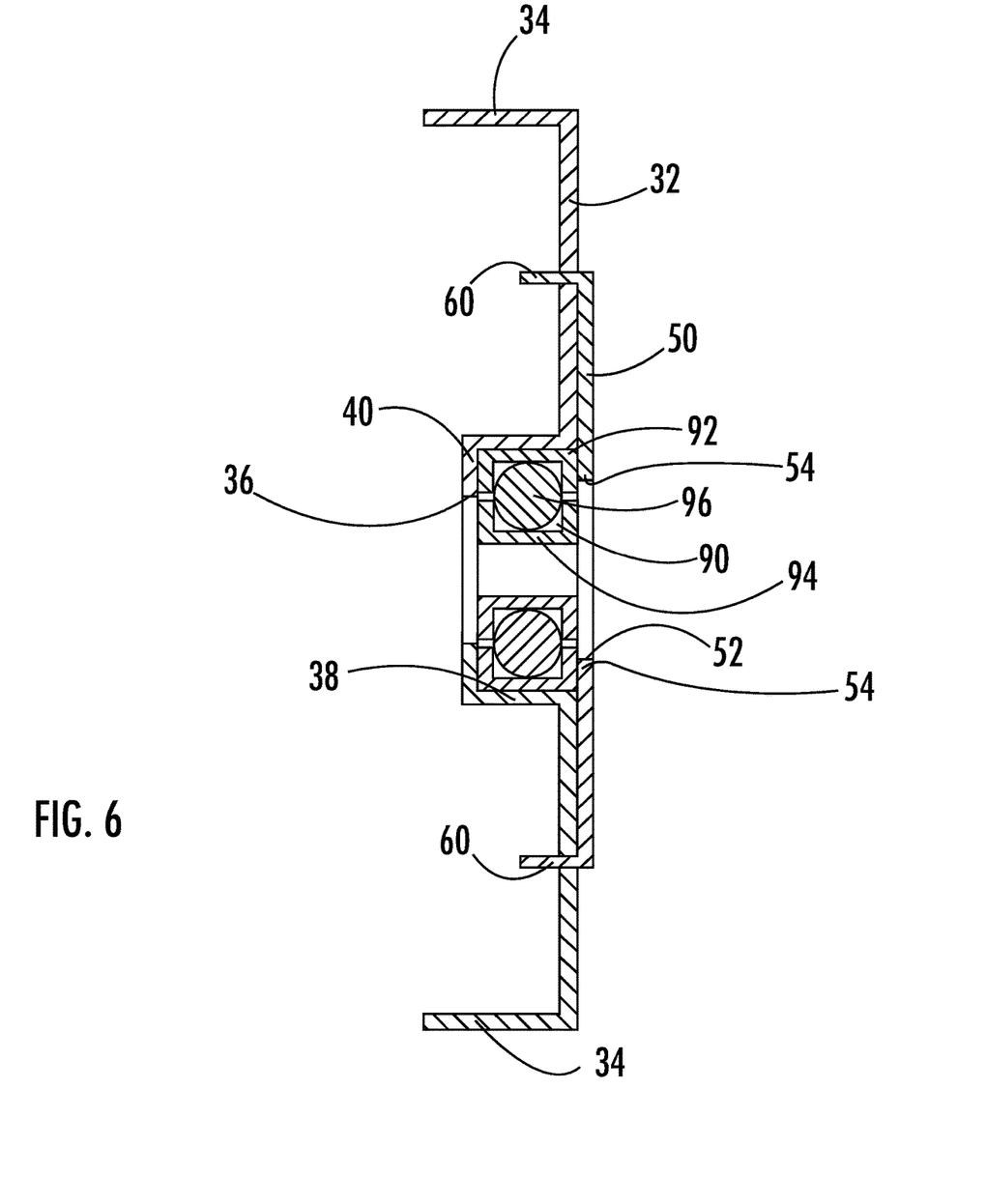
FIG. 6 is a sectional view of the zero distortion bearing pulley according to the disclosed inventive concept upon initial fitting of the first embodiment of the bearing retainer against the bearing face in which the retainer has a flat inner surface.
Figure 7:
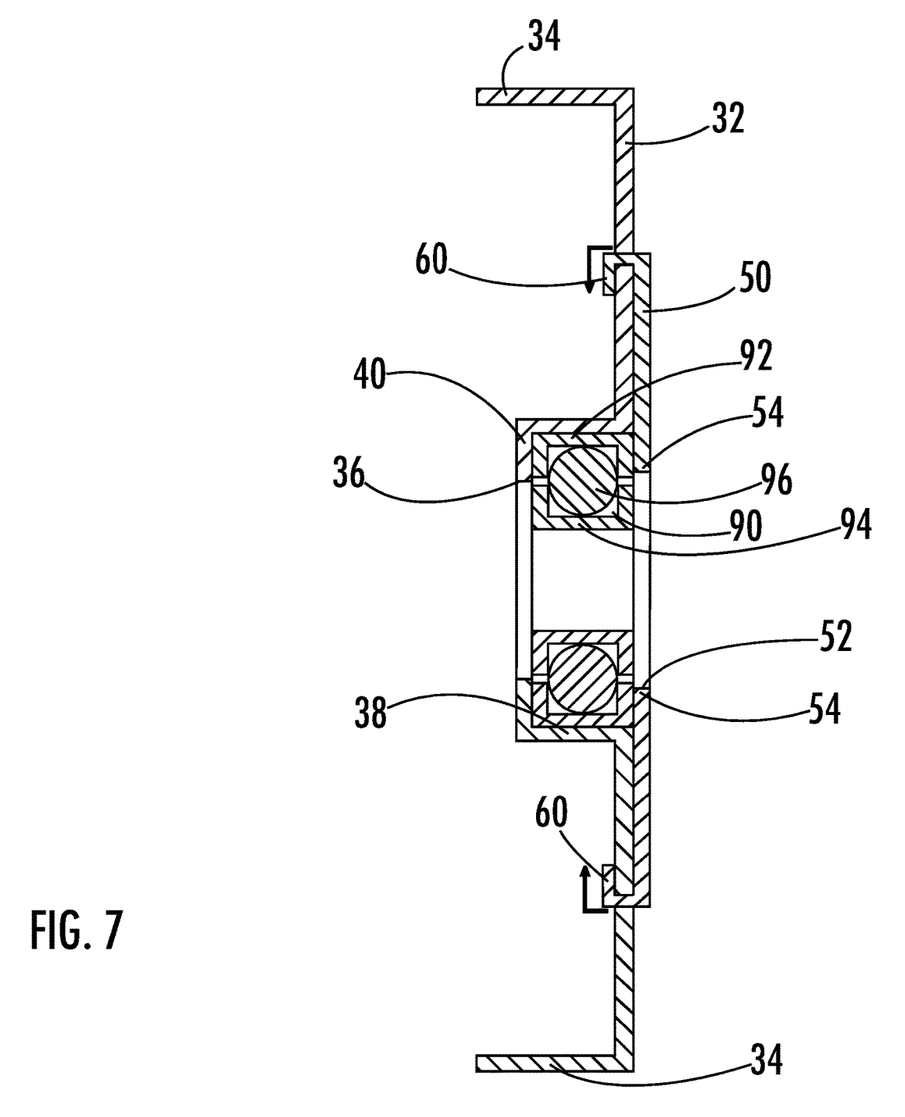
FIG. 7 is a sectional view of the zero distortion bearing pulley according to the disclosed inventive concept upon final fitting of the bearing retainer of FIG. 6.

A zero distortion bearing pulley according to the disclosed inventive concept is illustrated in FIG. 6. The assembly is illustrated upon initial fitting of the bearing retainer 50 (or the bearing retainer 70) to the pulley face 32. The same pulley is illustrated in FIG. 7. However, in FIG. 7, the tabs 60 are illustrated as having been folded over to lock the bearing retainer 50 in place relative to the pulley face 32.

A bearing assembly 90 is illustrated fitted in the slip fit bearing pocket 38. The bearing assembly 90 includes an outer raceway 92, an inner raceway 94, and a bearing 96 retained by any of known methods, including by a bearing cage.

The two embodiments of the bearing retainer, the bearing retainer 50 and the bearing retainer 70, are initially attached to the pulley face 32 in the same manner. Specifically, the tabs 60 of the bearing retainer 50 or the tabs 80 of the bearing retainer 70 are inserted into the slots 42 formed in the pulley face 32 until the tabs 60 or the tabs 80 extend through the slots 42 as illustrated in FIG. 6 in which a sectional view of an assembled pulley according to the disclosed inventive concept is illustrated. If the second embodiment of the bearing retainer is used, that is, if the bearing retainer 70 is used, then an additional step of rotating the bearing retainer 70 relative to the pulley face 32 is required so that the elongated tab slots 82 fixedly engage the slots 42 of the pulley face. Once the bearing retainer 70 is fully rotated, the end hooks 84 of each of the attachment tabs 80 are locked into the tab hook receiving holes 44 of the pulley face 32, thereby resisting reverse rotation of the bearing retainer 70. According to this arrangement, the folding over of the attachment tabs 80 is not necessary.

Regardless of the embodiment of the bearing retainer used, an adjustment and alignment tool (not shown) may be inserted through the holes 56 (if the first embodiment of the bearing retainer 50 is used) or through the holes 76 (if the second embodiment of the bearing retainer 70 is used) and into the adjustment and alignment holes 44 formed on the face 32 of the pulley 30.

Once the bearing retainers are properly attached and aligned, the tabs 60 (if the first embodiment of the bearing retainer 50 is used) or the tabs 80 (if the second embodiment of the bearing retainer 70 is used) are then folded over as illustrated in FIG. 7.

On assembly, the retainer wall 54 presses against the outer raceway 92 of the bearing assembly 90 as illustrated in both FIG. 6 and FIG. 7 as the diameter of the central bore 52 is roughly the same as the inner diameter of the outer bearing raceway 92. Accordingly, by clamping of the retainer wall 54 against the outer raceway 92 of the bearing assembly 90 according to the disclosed inventive concept, axial retention of the bearing in the pulley affects neither the roundness of the bearing outer race nor the radial internal clearance of the bearing.

The bearing retainer may be modified to include a raised rounded area. This variation is illustrated in FIGS. 8 and 9 in which a bearing retainer 98 includes a retainer wall 99 having a raised rounded area. According to this variation, the raised rounded area of the retainer wall 99 presses against the outer raceway 92 of the bearing assembly 90 as illustrated in both FIG. 8 and FIG. 9. Like the retainer wall 54 discussed above, by clamping of the retainer wall 99 against the outer raceway 92 of the bearing assembly 90, axial retention of the bearing in the pulley affects neither the roundness of the bearing outer race nor the radial internal clearance of the bearing.

An additional variation of the disclosed inventive concept is illustrated in FIG. 9 in which the tab 60 has been folded in the direction opposite that illustrated in FIG. 7. Both approaches are utilized to secure the bearing retainer to effectively the pulley face.

One skilled in the art will readily recognize from the above discussion, and from the accompanying drawings and claims, that various changes, modifications and variations can be made therein without departing from the true spirit and fair scope of the invention as defined by the following claims.

What is claimed is:

1. A pulley for use with a pulley belt, the pulley comprising:
    a pulley body including a central axis, a pulley face having a periphery, a belt running surface extending perpendicularly from said periphery, a bearing pocket formed in said face coaxial with said axis, and slots formed between said pocket and said periphery;
    a bearing disposed within said pocket; and
    a bearing retainer having a periphery and tabs extending from said periphery through said slots.

2. The pulley for use with a pulley belt of claim 1, wherein said bearing retainer is disc-shaped.

3. The pulley for use with a pulley belt of claim 1, wherein said bearing includes a raceway and wherein said retainer includes a centrally-formed aperture including a rounded bearing-retaining stop that presses against said raceway.

4. The pulley for use with a pulley belt of claim 1, wherein said pocket includes a bearing-retaining stop defined by a back wall.

5. The pulley for use with a pulley belt of claim 1, wherein said tabs are folded over to fix said bearing retainer to said face.

6. The pulley for use with a pulley belt of claim 1, wherein said pulley face includes tab hook apertures and each of said tabs includes a hook engageable with one of said tab hook apertures.

7. The pulley for use with a pulley belt of claim 1, wherein said pulley face and said bearing retainer include assembly tool holes.

8. The pulley for use with a pulley belt of claim 1, wherein said pulley body is formed from a stamping.

9. The pulley for use with a pulley belt of claim 8, wherein said bearing retainer is formed from a stamping.

10. A pulley for use with a pulley belt, the pulley comprising:
    a pulley body including a central axis, a pulley face having a periphery, a belt running surface extending from said periphery, a bearing pocket formed in said face coaxial with said axis, and slots formed between said pocket and said periphery;
    a bearing disposed within said pocket; and
    a bearing retainer having a periphery and folded-over tabs extending from said periphery through said slots.

11. The pulley for use with a pulley belt of claim 10, wherein said bearing retainer includes a centrally-formed hole defining a bearing-retaining stop.

12. The pulley for use with a pulley belt of claim 10, wherein said pocket includes a bearing-retaining stop defined by a back wall.

13. The pulley for use with a pulley belt of claim 10, wherein said pulley face includes tab hook apertures and each of said tabs includes a hook engageable with one of said tab hook apertures.

14. The pulley for use with a pulley belt of claim 10, wherein said belt running surface is perpendicular relative said pulley face.

15. The pulley for use with a pulley belt of claim 10, wherein said pulley face and said bearing retainer include assembly tool holes.

16. The pulley for use with a pulley belt of claim 10, wherein said pulley body is formed from a stamping.

17. The pulley for use with a pulley belt of claim 16, wherein said bearing retainer is formed from a stamping.

\* \* \* \* \*